(12) United States Patent
Tsai

(10) Patent No.: US 12,445,017 B2
(45) Date of Patent: Oct. 14, 2025

(54) MOTOR DRIVER USING SPREAD SPECTRUM MECHANISM FOR REDUCING ELECTROMAGNETIC INTERFERENCE

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 166 days.

(21) Appl. No.: 18/423,487

(22) Filed: Jan. 26, 2024

(65) Prior Publication Data

US 2025/0141311 A1    May 1, 2025

(30) Foreign Application Priority Data

Oct. 27, 2023   (TW) .................... 112141173

(51) Int. Cl.
  *H02P 6/12* (2006.01)
  *H02K 11/02* (2016.01)
  *H02K 11/33* (2016.01)
  *H03K 7/06* (2006.01)
  *H04B 1/715* (2011.01)

(52) U.S. Cl.
  CPC .......... *H02K 11/02* (2013.01); *H02K 11/33* (2016.01); *H03K 7/06* (2013.01); *H04B 1/715* (2013.01); *H04B 2001/7154* (2013.01)

(58) Field of Classification Search
  CPC .......... H02K 11/02; H02K 11/33; H03K 7/06; H04B 1/715; H04B 2001/7154; H02P 25/16; H02P 27/04; H02M 1/44
  See application file for complete search history.

(56) References Cited

U.S. PATENT DOCUMENTS

| | | | |
|---|---|---|---|
| 2021/0083606 A1 | 3/2021 | Tsai | |
| 2022/0140758 A1* | 5/2022 | Chang | H02P 6/12 |
| | | | 318/400.08 |
| 2023/0136279 A1* | 5/2023 | Kuo | H02M 3/01 |
| | | | 363/21.02 |
| 2023/0292042 A1* | 9/2023 | Rutkowski | H02P 25/032 |

FOREIGN PATENT DOCUMENTS

TW    202114342 A    4/2021

* cited by examiner

*Primary Examiner* — Muhammad S Islam

(74) *Attorney, Agent, or Firm* — Li & Cai Intellectual Property (USA) Office

(57) ABSTRACT

A motor driver using a spread spectrum mechanism for reducing electromagnetic interference is provided. The motor driver generates a plurality of waveforms in each of a plurality of on-time signals, and modulates frequencies of at least some of the plurality of waveforms in each of the plurality of on-time signals to be different from each other. The motor driver drives the motor according to the modulated plurality of on-time signals. As a result, electromagnetic wave energy emitted by the motor driver of the present disclosure is changed or dispersed such that the electromagnetic wave energy is not overly concentrated at a same frequency. Therefore, the motor driver of the present disclosure is prevented from emitting the accumulated and amplified electromagnetic wave energy to cause electromagnetic interference to the operations of other circuit components.

18 Claims, 13 Drawing Sheets

MOTOR DRIVER USING SPREAD SPECTRUM MECHANISM FOR REDUCING ELECTROMAGNETIC INTERFERENCE

CROSS-REFERENCE TO RELATED PATENT APPLICATION

This application claims the benefit of priority to Taiwan Patent Application No. 112141173, filed on Oct. 27, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor driver using a spread spectrum mechanism for reducing electromagnetic interference.

BACKGROUND OF THE DISCLOSURE

Fans are often used to cool down processors and other heat-generating components in electronic devices. However, the fans are usually continually driven by conventional motor drivers to operate at a specific frequency. When the conventional motor drivers continually drive the motor at the specific frequency over a long period of time, electromagnetic wave energy is continuously accumulated and amplified at the specific frequency to form high electromagnetic wave energy. As such, the high electromagnetic wave energy emitted by the conventional motor drivers can easily interfere with other circuit components.

SUMMARY OF THE DISCLOSURE

In response to the above-referenced technical inadequacies, the present disclosure provides a motor driver using a spread spectrum mechanism for reducing electromagnetic interference. The motor driver includes a waveform frequency modulating circuit and a motor driving circuit. The waveform frequency modulating circuit is configured to generate a plurality of waveforms in each of a plurality of on-time signals and to output the plurality of on-time signals. The motor driving circuit is connected to the waveform frequency modulating circuit and a motor. The motor driving circuit is configured to drive the motor according to the plurality of on-time signals from the waveform frequency modulating circuit. The waveform frequency modulating circuit modulates frequencies of at least some of the plurality of waveforms of each of the plurality of on-time signals to be different from each other such that electromagnetic wave energy emitted by the motor driver is dispersed.

As described above, the present disclosure provides the motor driver using the spread spectrum mechanism. The electromagnetic wave energy of the on-time signals outputted by the motor driver of the present disclosure is changed or dispersed at different ones of the plurality of frequencies. Therefore, the electromagnetic wave energy is not overly concentrated at the same one of the plurality of frequencies. As a result, the motor driver of the present disclosure is prevented from emitting the accumulated and amplified electromagnetic wave energy to cause electromagnetic interference to the operations of other circuit components. Therefore, through the motor driver of the present disclosure, electromagnetic suppression or elimination components such as beads do not need to be disposed on the circuit board, which saves circuit cost for configuration of circuit components, and wires on a circuit board do not need to be changed, which improving on the issue of high electromagnetic wave energy being emitted toward the other circuit components.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
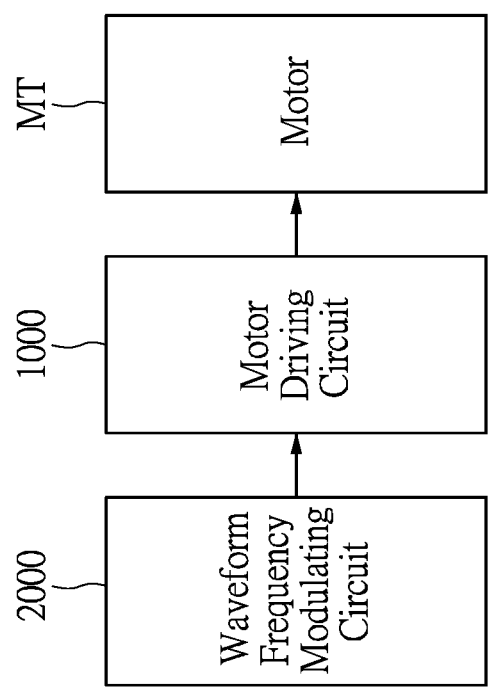
FIG. 1 is a block diagram of a motor driver using a spread spectrum mechanism for reducing electromagnetic interference according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a motor driver using a spread spectrum mechanism for reducing electromagnetic interference according to a first embodiment of the present disclosure.

The motor driver of the present disclosure is applied to the motor MT. The motor driver of the present disclosure includes a motor driving circuit 1000 and a waveform frequency modulating circuit 2000.

The motor driving circuit 1000 is connected to the waveform frequency modulating circuit 2000 and the motor MT.

The waveform frequency modulating circuit 2000 generates a plurality of waveforms in each of a plurality of on-time signals and outputs the plurality of on-time signals. The motor driving circuit 1000 drives the motor MT according to the plurality of on-time signals from the waveform frequency modulating circuit 2000.

It is worth noting that, the waveform frequency modulating circuit 2000 modulates frequencies of at least some of the plurality of waveforms of each of the plurality of on-time signals to be different from each other. As a result, when the motor driver of the present disclosure drives the motor MT according to the plurality of on-time signals, high electromagnetic wave energy is prevented from being emitted by the motor driver of the present disclosure at the same time point. Therefore, operations of other circuit components are not interfered with by the high electromagnetic wave energy.

Figure 2:
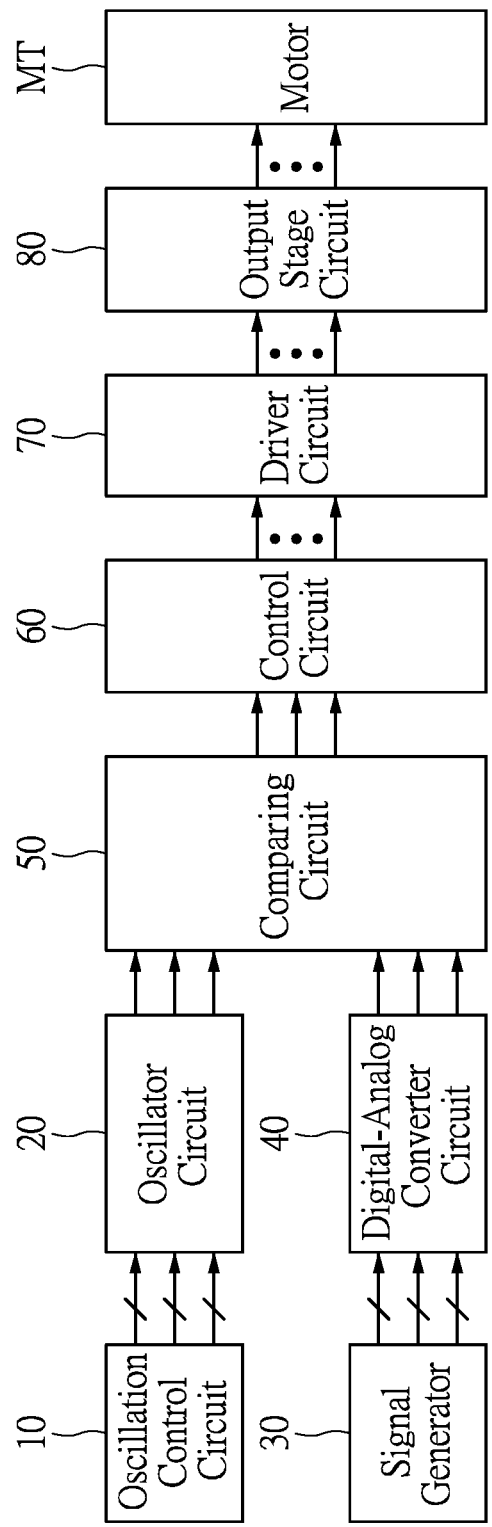
FIG. 2 is a block diagram of a motor driver using a spread spectrum mechanism for reducing electromagnetic interference according to a second embodiment of the present disclosure.
Figure 3:
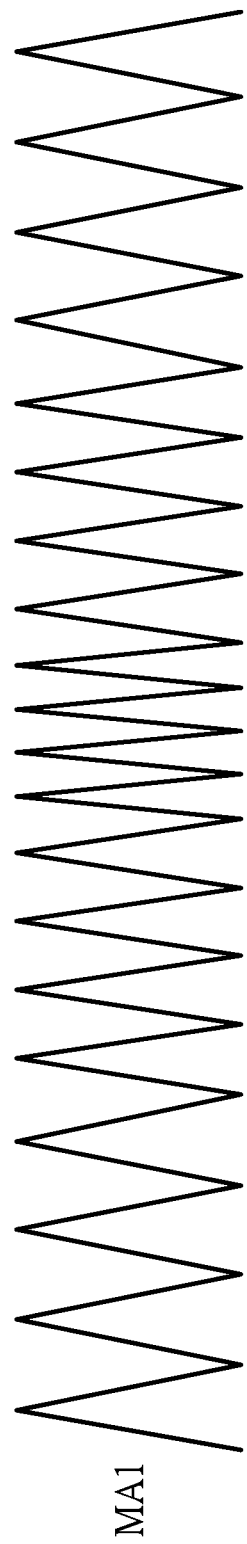
FIG. 3 is a waveform diagram of a first waveform signal of the motor driver using the spread spectrum mechanism for reducing the electromagnetic interference according to the second embodiment of the present disclosure.
Figure 4:
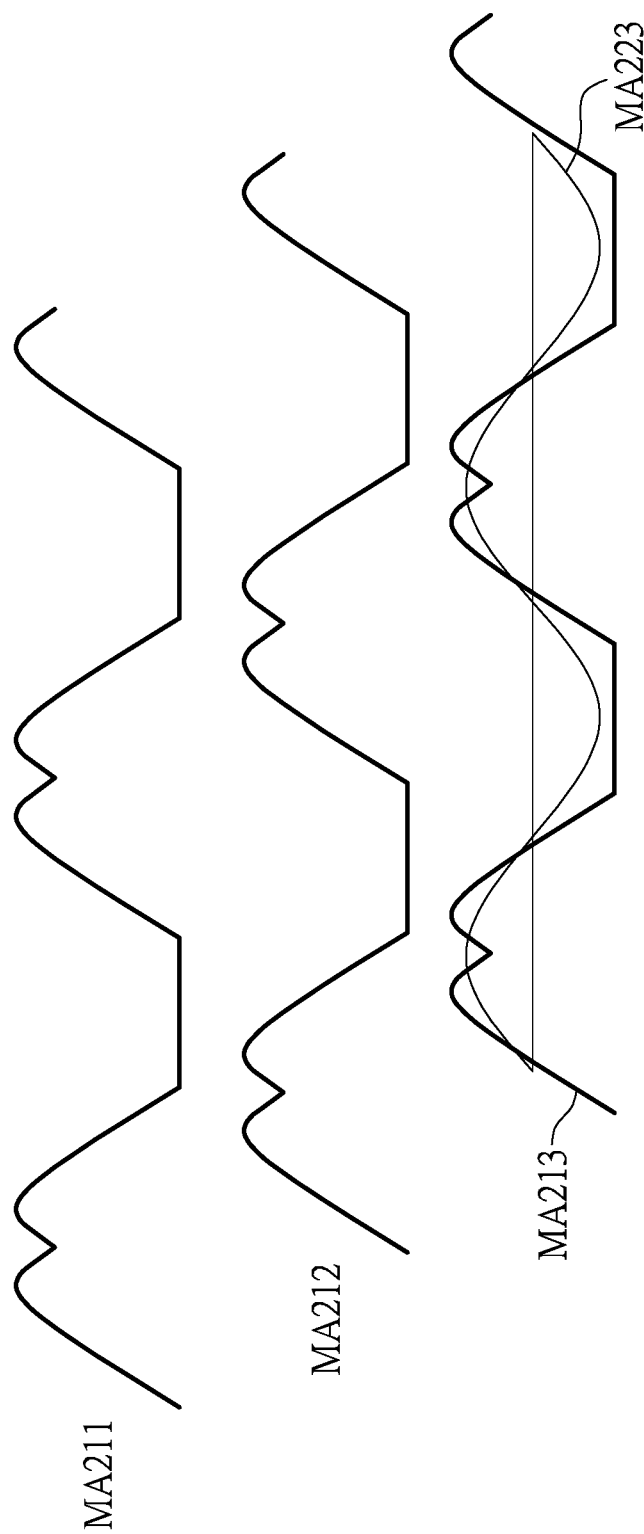
FIG. 4 is a waveform diagram of second waveform signals of the motor driver using the spread spectrum mechanism for reducing the electromagnetic interference according to the second embodiment of the present disclosure.
Figure 5:
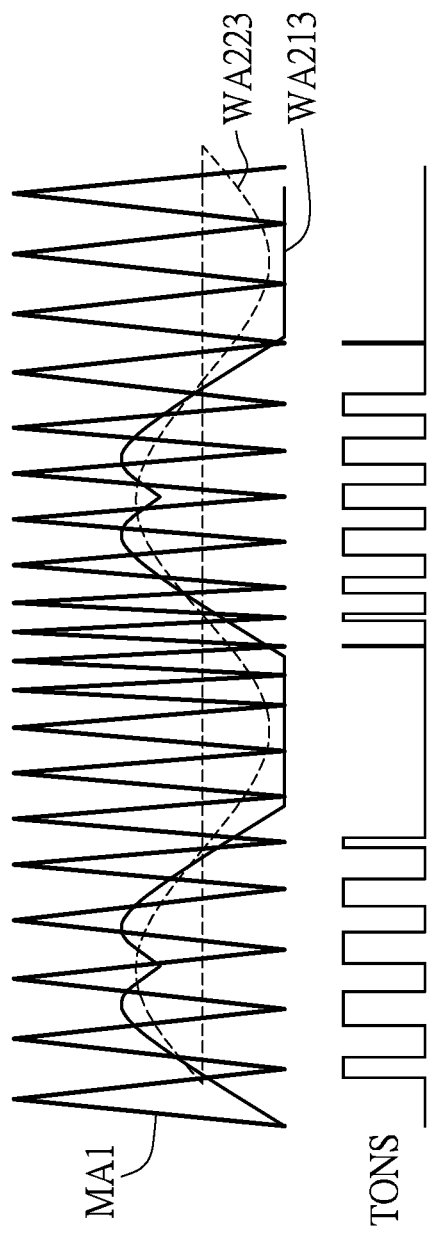
FIG. 5 is a waveform diagram of the first waveform signal, the second waveform signals and an on-time signal of the motor driver using the spread spectrum mechanism for reducing the electromagnetic interference according to the second embodiment of the present disclosure.

Reference is made to FIG. 2 to FIG. 5, in which FIG. 2 is a block diagram of a motor driver using a spread spectrum mechanism for reducing electromagnetic interference according to a second embodiment of the present disclosure, FIG. 3 is a waveform diagram of a first waveform signal of the motor driver using the spread spectrum mechanism for reducing the electromagnetic interference according to the second embodiment of the present disclosure, FIG. 4 is a waveform diagram of second waveform signals of the motor driver using the spread spectrum mechanism for reducing the electromagnetic interference according to the second embodiment of the present disclosure, and FIG. 5 is a waveform diagram of the first waveform signal, the second waveform signals and an on-time signal of the motor driver using the spread spectrum mechanism for reducing the electromagnetic interference according to the second embodiment of the present disclosure.

The motor driver of the present disclosure is applied to the motor MT.

The motor driver of the present disclosure includes a motor driving circuit and a waveform frequency modulating circuit. As shown in FIG. 2, in the second embodiment, the waveform frequency modulating circuit includes an oscillation control circuit 10, an oscillator circuit 20, a signal generator 30, a digital-analog converter circuit 40 and a comparing circuit 50, and the motor driving circuit includes a control circuit 60, a driver circuit 70 and an output stage circuit 80.

The oscillation control circuit 10 is connected to the oscillator circuit 20. The signal generator 30 is connected to the digital-analog converter circuit 40. The comparing circuit 50 is connected to the oscillator circuit 20, the digital-analog converter circuit 40 and the control circuit 60. The control circuit 60 is connected to the comparing circuit 50 and the driver circuit 70. The output stage circuit 80 is connected to the driver circuit 70 and the motor MT such as a three-phase motor.

The oscillation control circuit 10 outputs an oscillation controlling signal to the oscillator circuit 20.

The oscillator circuit 20 sets a slope of each of a plurality of waveforms of each of a plurality of first waveform signals according to the oscillation controlling signal from the oscillation control circuit 10.

It is worth noting that, the oscillator circuit 20 modulates the slopes of at least some of the plurality of first waveforms of each of the plurality of first waveform signals to be different from each other. In detail, the oscillator circuit 20 modulates slopes of rising waveform segments of at least some of the plurality of first waveforms of each of the plurality of first waveform signals to be different from each other. In addition or alternatively, the oscillator circuit 20 modulates slopes of falling waveform segments of at least some of the plurality of first waveforms of each of the plurality of first waveform signals to be different from each other.

For convenience of description, the plurality of waveforms of each of the plurality of first waveform signals are defined as a plurality of first waveforms as described herein. The oscillator circuit 20 outputs the plurality of first waveform signals each having the plurality of first waveforms to the comparing circuit 50.

For example, the plurality of first waveform signals outputted by the oscillator circuit 20 may include three of same first waveform signals that are respectively used for a U-phase, a V-phase and a W-phase of the motor MT, such as a first waveform signal WA1 as shown in FIG. 3, but the present disclosure is not limited thereto. The plurality of first waveforms of each of the plurality of first waveform signals outputted by the oscillator circuit 20 may include triangle waveforms, sawtooth waveform or a combination thereof, and slopes or frequencies of at least some of the plurality of first waveforms of each of the plurality of first waveform signals are different from each other.

The oscillator circuit 20 may set a plurality of reference slopes. The oscillator circuit 20 may modulate the slopes of the plurality of first waveforms that are consecutively generated in each of the plurality of first waveform signals within a same one of the plurality of time intervals to be equal to a same one of the plurality of reference slopes. It is worth noting that, the oscillator circuit 20 may modulate the slopes of the plurality of first waveforms that are generated within at least one of the plurality of time intervals to be different from the slopes of the plurality of first waveforms that are generated within another of the plurality of time intervals. For example, as shown in FIG. 3, the oscillator circuit 20 generates the plurality of first waveforms each having a small slope in the first waveform signal WA1 within one of the plurality of time intervals, then generates the plurality of first waveforms each having a large slope in the first waveform signal WA1 within another of the plurality of time intervals, and then generates a plurality of first waveforms each having the small slope in the first waveform signal WA1 within the other of the plurality of time intervals.

The signal generator 30 outputs a plurality of second waveform signals that are digital signals. For example, the plurality of second waveform signals outputted by the oscillator circuit 20 may include three second waveform signals that are respectively used for the U-phase, the V-phase and the W-phase of the motor MT, such as second waveform signals WA211, WA212, WA213 each having a plurality of third harmonic waveforms or one or more second waveform signals WA223 each having a plurality of sinusoidal waveforms as shown in FIG. 4, but the present disclosure is not limited thereto.

The digital-analog converter circuit 40 receives the plurality of second waveform signals from the signal generator 30 and then converts the plurality of second waveform signals that are the digital signals into analog signals.

For convenience of description, the plurality of waveforms of each of the second waveform signals are respectively defined as a plurality of second waveforms herein. The digital-analog converter circuit 40 outputs the plurality of second waveform signals each having the plurality of second waveforms to the comparing circuit 50.

The comparing circuit 50 compares voltages of the plurality of first waveforms of each of the plurality of first waveform signals from the oscillator circuit 20 with voltages of the plurality of second waveforms of each of the plurality of second waveform signals from the digital-analog converter circuit 40 to determine duty cycles of the plurality of waveforms of the plurality of on-time signals.

For example, as shown in FIG. 5, when a voltage of the third harmonic waveform (that may be replaced with a sinusoidal waveform in practice) of the second waveform signal WA213 is higher than a voltage of the triangle waveform of the first waveform signal WA1, an on-time signal TONS is at a high level. Conversely, when the voltage of the third harmonic waveform of the second waveform signal WA213 is lower than the voltage of the triangle waveform of first waveform signal WA1, the on-time signal TONS is at a low level.

The control circuit 60 outputs a plurality of control signals according to the plurality of on-time signals from the comparing circuit 50. The driver circuit 70 outputs a plurality of driving signals according to the plurality of control signals from the control circuit 60.

The output stage circuit 80 operates to drive the motor MT according to the plurality of driving signals from the driver circuit 70. The output stage circuit 80 may include a plurality of high-side switches and a plurality of low-side switches. A first terminal of each of the plurality of high-side switches may be coupled to a common voltage. Second terminals of the plurality of high-side switches may be connected to first terminals of the plurality of low-side switches, respectively. A node between the second terminal of each of the plurality of high-side switches and the first terminal of each of the plurality of low-side switches is connected to a terminal of the motor MT. A second terminal of each of the plurality of low-side switches is grounded. Control terminals of the plurality of high-side switches and the plurality of low-side switches may be connected to an output terminal of the driver circuit 70, and may receive the plurality of driving signals from the driver circuit 70, respectively.

It is worth noting that, the larger the slope of the waveform is, the higher the frequency of the waveform is. The slopes of at least some of the plurality of first waveforms in each of the plurality of first waveform signals that are received from the oscillator circuit 20 by the comparing circuit 50 are different from each other. Under this condition, the frequencies of at least some of the plurality of first waveforms in each of the plurality of first waveform signals are different from each other. Accordingly, the frequencies of at least some of the plurality of waveforms in each of the plurality of on-time signals outputted by the comparing circuit 50 are different from each other.

Therefore, the electromagnetic wave energy emitted by the motor driver of the present disclosure is dispersed, thereby reducing electromagnetic interference to which other circuit components are subjected.

Figure 6:
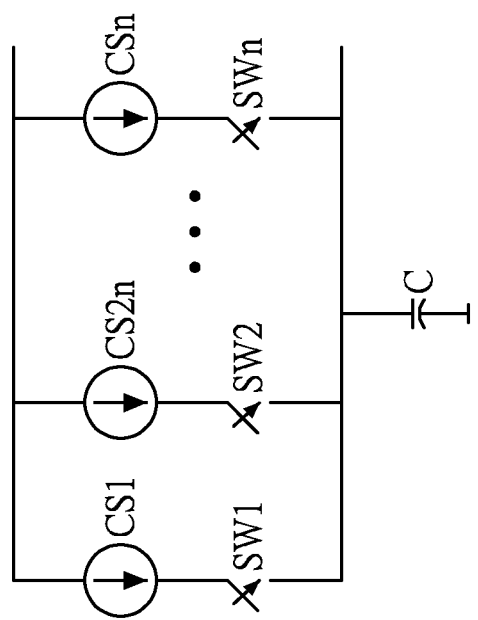
FIG. 6 is a circuit diagram of an oscillation control circuit and an oscillator circuit of the motor driver using the spread spectrum mechanism for reducing the electromagnetic interference according to the second embodiment of the present disclosure.

Reference is made to FIG. 2 and FIG. 6, in which FIG. 6 is a circuit diagram of an oscillation control circuit and an oscillator circuit of the motor driver using the spread spectrum mechanism for reducing the electromagnetic interference according to the second embodiment of the present disclosure.

For example, the oscillation control circuit 10 as shown in FIG. 2 may include a plurality of current sources CS1 to CSn and a plurality of switching components SW1 to SWn as shown in FIG. 6, and the oscillator circuit 20 as shown in FIG. 2 may include a capacitor C as shown in FIG. 6, but the present disclosure is not limited thereto.

The number of the current sources included in the oscillation control circuit 10, the number of the switching components included in the oscillation control circuit 10, the number of the capacitor included in the oscillator circuit 20 may depend on actual requirements.

In the oscillation control circuit 10, the plurality of current sources CS1 to CSn may be connected to first terminals of the plurality of switching components SW1 to SWn respectively. A second terminal of each of the plurality of switching components SW1 to SWn of the oscillation control circuit 10 may be connected to a first terminal of the capacitor C included in the oscillator circuit 20.

The current sources CS1 to CSn supply a plurality of currents that may have different current values respectively.

Each of the plurality of switching components SW1 to SWn may be switched between an on-state and an off-state. A voltage signal of the capacitor C included in the oscillator circuit 20 is outputted as each of the plurality of first waveform signals to the comparing circuit 50.

The switching components SW1 to SWn are optionally switched to the on-state according to actual requirements. Rising speed and falling speed of a voltage of the voltage signal (that is the first waveform signal) of the capacitor C are changed with changes in a frequency of switching different ones of the plurality of switching components SW1 to SWn to the on-state. As a result, slopes of a plurality of waveforms of the voltage signal (that is the first waveform signal) of the capacitor C are different from each other. Therefore, the electromagnetic wave energy emitted by the motor driver of the present disclosure is dispersed, thereby reducing electromagnetic interference to which other circuit components are subjected.

Figure 7:
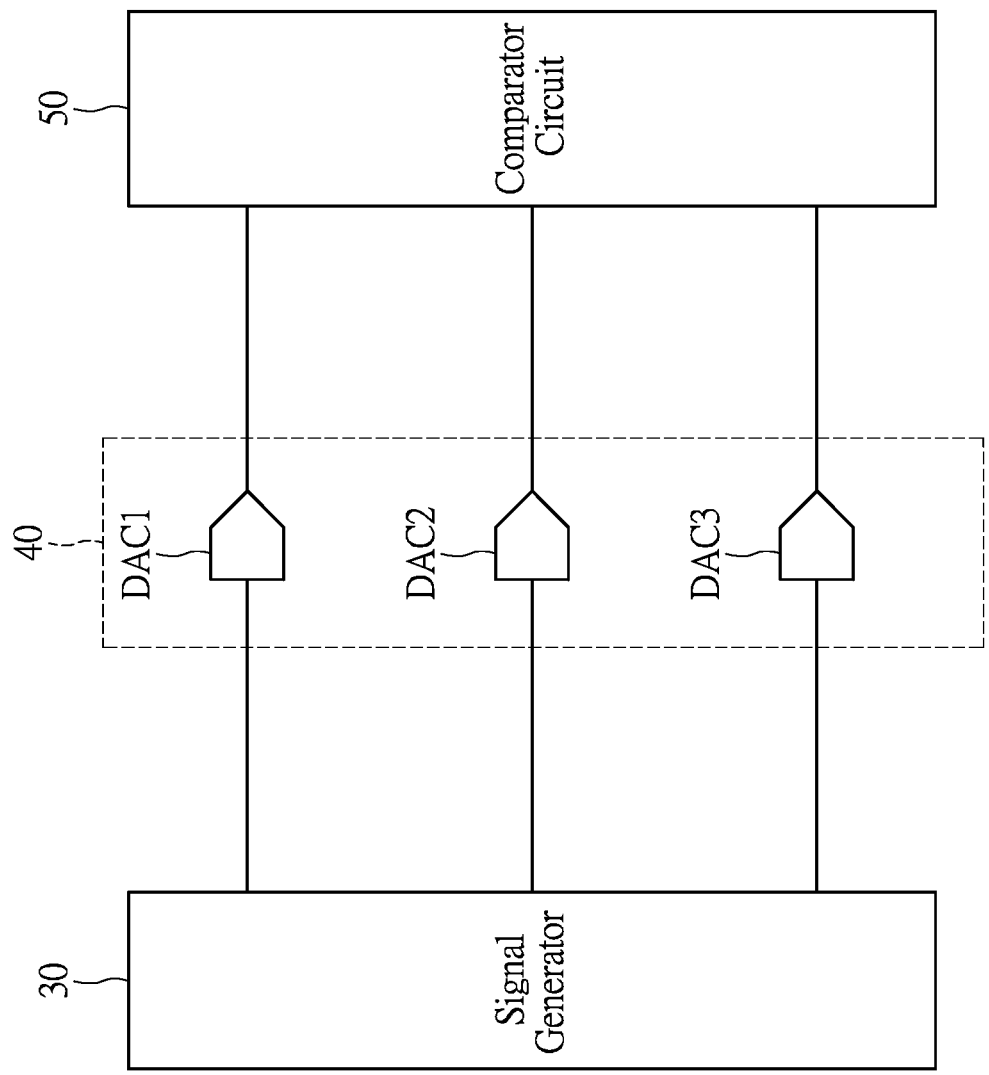
FIG. 7 is a circuit diagram of a digital-analog converter circuit of the motor driver using the spread spectrum mechanism for reducing the electromagnetic interference according to the second embodiment of the present disclosure.

Reference is made to FIG. 2 and FIG. 7, in which FIG. 7 is a circuit diagram of a digital-analog converter circuit of the motor driver using the spread spectrum mechanism for reducing the electromagnetic interference according to the second embodiment of the present disclosure.

The digital-analog converter circuit 40 as shown in FIG. 2 may include a plurality of digital-analog converters such as, but not limited to, a first digital-analog converter DAC1, a second digital-analog converter DAC2 and a third digital-analog converter DAC3 as shown in FIG. 7. The first digital-analog converter DAC1, the second digital-analog converter DAC2 and the third digital-analog converter DAC3 are connected between the signal generator 30 and the comparing circuit 50, and are used for the U-phase, the V-phase and the W-phase of the motor MT respectively.

The plurality of digital-analog converters such as the first digital-analog converter DAC1, the second digital-analog converter DAC2 and the third digital-analog converter DAC3 as shown in FIG. 7 respectively convert the plurality of second waveform signals that are digital signals into the analog signals, and output the converted second waveform signals to the comparing circuit 50.

Figure 8:
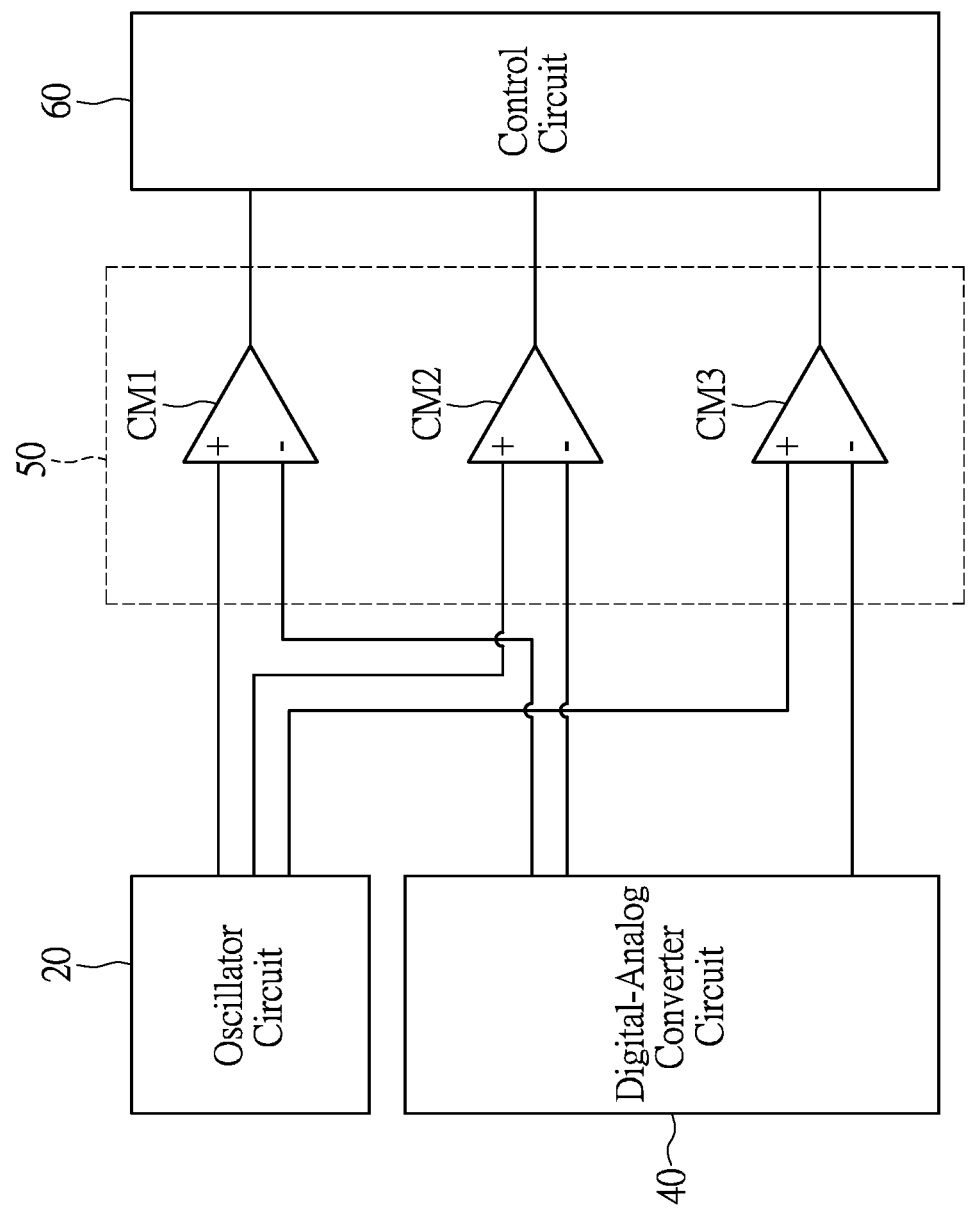
FIG. 8 is a circuit diagram of a comparing circuit of the motor driver using the spread spectrum mechanism for reducing the electromagnetic interference according to the second embodiment of the present disclosure.

Reference is made to FIG. 2 and FIG. 8, in which FIG. 8 is a circuit diagram of a comparing circuit of the motor driver using the spread spectrum mechanism for reducing the electromagnetic interference according to the second embodiment of the present disclosure.

For example, the comparing circuit 50 as shown in FIG. 2 may include a plurality of comparators such as, but not limited to a plurality of comparators CM1 to CM3 as shown in FIG. 8.

First input terminals such as non-inverting input terminals of the plurality of comparators CM1 to CM3 as shown in FIG. 8 are connected to the oscillator circuit 20 as shown in FIG. 2 (or the first terminal of the capacitor C as shown in FIG. 6), and receive the plurality of first waveform signals from the oscillator circuit 20 respectively.

Second input terminal such as inverting input terminals of the plurality of comparators CM1 to CM3 as shown in FIG. 8 are connected to an output terminal of the digital-analog converter circuit 40 as shown in FIG. 2, or are connected to an output terminal of the first digital-analog converter DAC1, an output terminal of the second digital-analog converter DAC2 and an output terminal of the third digital-analog converter DAC3 respectively as shown in FIG. 7.

The second input terminal such as the inverting input terminals of the plurality of comparators CM1 to CM3 receive the plurality of second waveform signals each having the plurality of second waveforms from the digital-analog converter circuit 40 respectively.

As shown in FIG. 8, an output terminal of each of the plurality of comparators CM1 to CM3 is connected to an input terminal of the control circuit 60. Each of the plurality of comparators CM1 to CM3 compares the voltages of the received first waveform signal with the voltages of the received second waveform signal to output the on-time signal to the control circuit 60.

Figure 9:
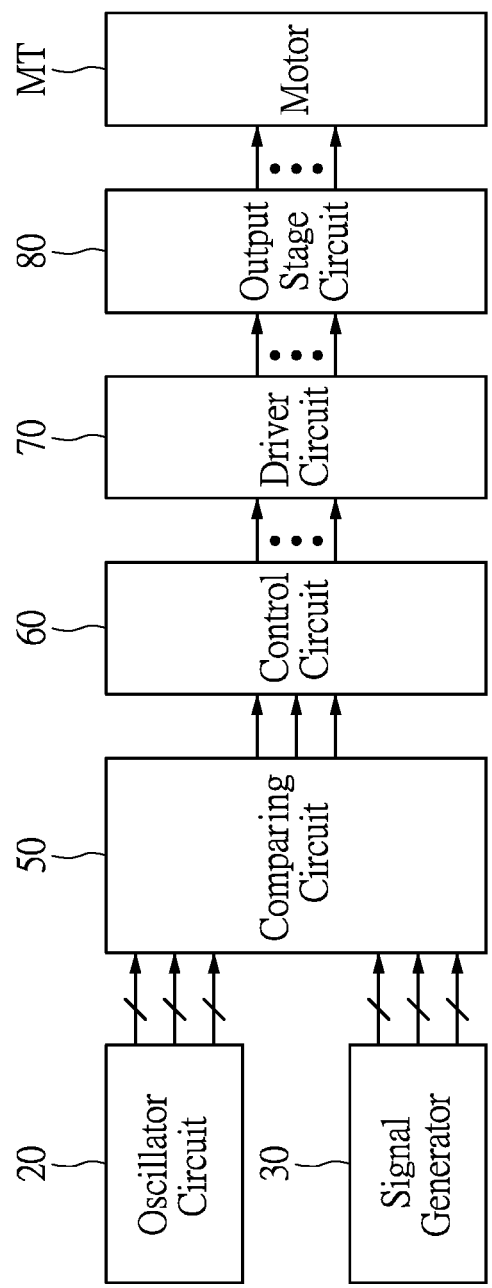
FIG. 9 is a block diagram of a motor driver using a spread spectrum mechanism for reducing electromagnetic interference according to a third embodiment of the present disclosure.
Figure 10:
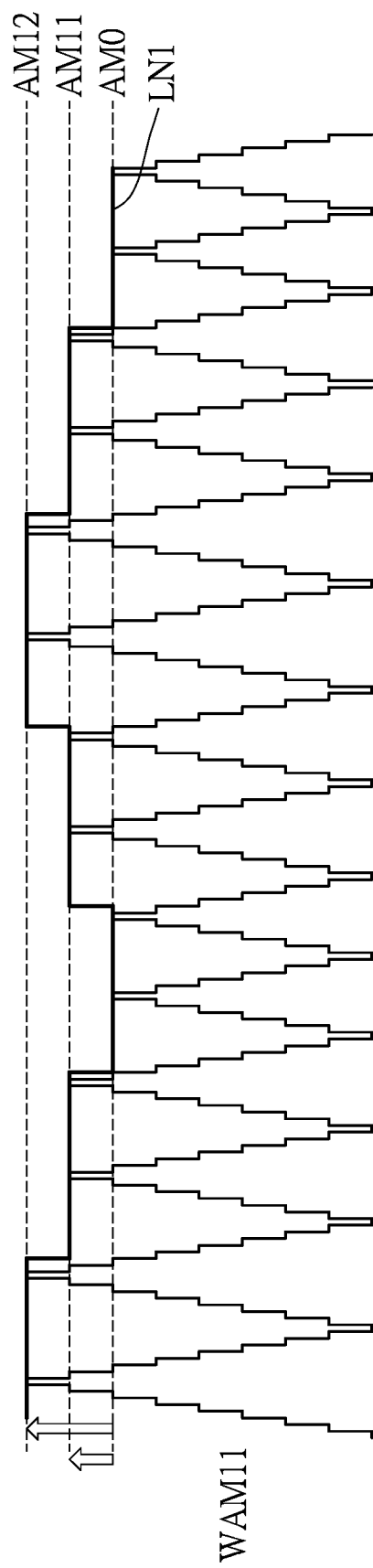
FIG. 10 is a waveform diagram of a first waveform signal of the motor driver using the spread spectrum mechanism for reducing the electromagnetic interference according to the third embodiment of the present disclosure.
Figure 11:
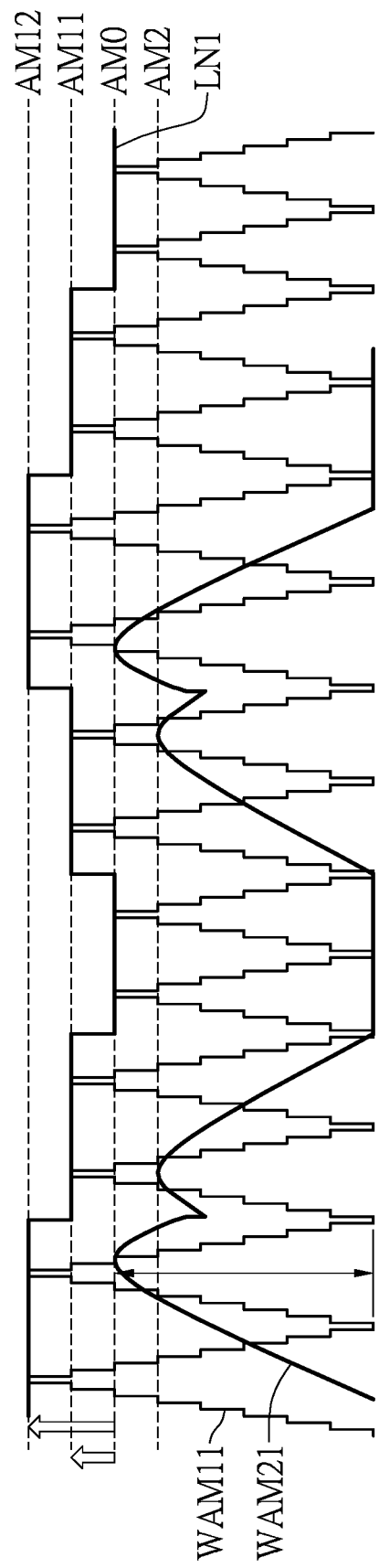
FIG. 11 is a waveform diagram of the first waveform signal and a second waveform signal of the motor driver using the spread spectrum mechanism for reducing the electromagnetic interference according to the third embodiment of the present disclosure.
Figure 13:
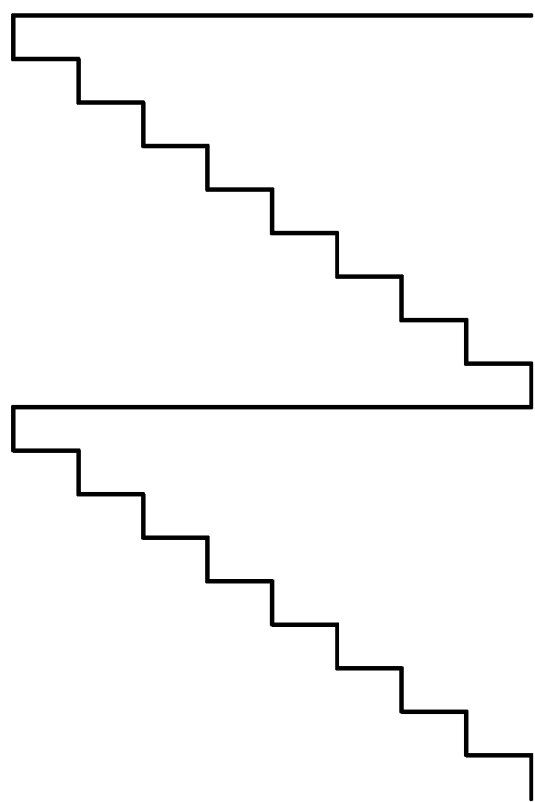
FIG. 13 is a waveform diagram of a first waveform signal having a plurality of sawtooth waveforms generated by the motor driver using the spread spectrum mechanism for reducing the electromagnetic interference according to the third embodiment of the present disclosure.

Reference is made to FIG. 9 to FIG. 11 and FIG. 13, in which FIG. 9 is a block diagram of a motor driver using a spread spectrum mechanism for reducing electromagnetic interference according to a third embodiment of the present disclosure, FIG. 10 is a waveform diagram of a first waveform signal of the motor driver using the spread spectrum mechanism for reducing the electromagnetic interference according to the third embodiment of the present disclosure, FIG. 11 is a waveform diagram of the first waveform signal and a second waveform signal of the motor driver using the spread spectrum mechanism for reducing the electromagnetic interference according to the third embodiment of the present disclosure, and FIG. 13 is a waveform diagram of a first waveform signal having a plurality of sawtooth waveforms generated by the motor driver using the spread spectrum mechanism for reducing the electromagnetic interference according to the third embodiment of the present disclosure.

The motor driver of the present disclosure is applied to the motor MT.

The motor driver of the present disclosure includes a motor driving circuit and a waveform frequency modulating circuit. As shown in FIG. 3, in the motor driver of the third embodiment of the present disclosure, the waveform frequency modulating circuit includes the oscillator circuit 20, the signal generator 30 and the comparing circuit 50, and the motor driving circuit includes the control circuit 60, the driver circuit 70 and the output stage circuit 80.

The comparing circuit 50 is connected to the oscillator circuit 20, the signal generator 30 and the control circuit 60. The output stage circuit 80 is connected to the driver circuit 70 and the motor MT.

The oscillator circuit 20 sets a plurality of first reference amplitudes. At least some of the plurality of first reference amplitudes are different from each other. The oscillator circuit 20 generates the plurality of first waveforms in each of the plurality of first waveform signals. The oscillator circuit 20 modulates the amplitudes of the plurality of first waveforms in each of the plurality of first waveform signals to be equal to the plurality of first reference amplitudes, respectively. That is, at least some of the plurality of first waveforms of each of the plurality of first waveform signals are different from each other. The oscillator circuit 20 outputs the plurality of first waveform signals to the comparing circuit 50.

If amplitudes of a plurality of first initial waveforms stored in the oscillator circuit 20 are equal to each other, the oscillator circuit 20 may modulate the amplitudes of the plurality of first initial waveforms in each of the plurality of first waveform signals to be equal to the plurality of first reference amplitudes, respectively, and may use the modulated first initial waveforms as the plurality of first waveforms, respectively.

For example, the oscillator circuit 20 may modulate amplitudes AM0 of ones of the plurality of first initial waveforms to form amplitudes AM11 of a first waveform signal WAM11 as shown in FIG. 10. In addition or alternatively, the oscillator circuit 20 may modulate amplitudes AM0 of other ones of the plurality of first initial waveforms to form amplitudes AM12 of the first waveform signal WAM11 as shown in FIG. 10. The oscillator circuit 20 may not modulate amplitudes AM0 of the other ones of the plurality of first initial waveforms of the first waveform signal WAM11 as shown in FIG. 10. The amplitudes of at least some of the plurality of first initial waveforms of the first waveform signal WAM11 are different from each other as marked by an amplitude marker line LN1 as shown in FIG. 10.

For example, the plurality of first waveforms may all be triangular waveforms as shown in FIG. 10, and the rising and falling waveform segments of the triangular waveforms are staircase-shaped waveform segments, but the present disclosure is not limited thereto. In addition or alternatively, the plurality of first waveforms may include a plurality of sawtooth waveforms, and the rising waveform segments of the plurality of sawtooth waveforms are staircase-shaped waveform segments as shown in FIG. 13.

If the rising waveform segments of the plurality of first waveform of the plurality of first waveform signals are the staircase-shaped waveform segments, the oscillator circuit 20 may set a number of steps of the rising waveform segments of the plurality of first waveforms of each of the plurality of first waveform signals to be equal to a plurality of reference rising step numbers respectively. At least some of the plurality of reference rising step numbers are different from each other.

The oscillator circuit 20 gradually constructs the plurality of steps of the rising waveform segment of each of the plurality of first waveforms of each of the plurality of first waveform signals from an initial voltage (such as a valley voltage of the first waveform signal WAM11) and counts the number of the constructed steps until when the amplitude of each of the plurality of first waveforms reaches the first reference amplitude (such as the amplitude AM11 or AM12 of the first waveform signal WAM11 as shown in FIG. 10). At this time, a voltage of one of the plurality of steps of each of the plurality of first waveforms reaches a peak voltage of each of the plurality of first waveforms.

If the falling waveform segments of the triangular waveforms of the plurality of first waveform signals are the staircase-shaped waveform segments, the oscillator circuit 20 may set a number of steps of the falling waveform segments of the plurality of first waveforms of each of the plurality of first waveform signals to be equal to a plurality of reference falling step numbers, respectively, and at least some of the plurality of reference falling step numbers respectively of the falling waveform segments of the plurality of first waveforms are different from each other.

The oscillator circuit 20 gradually constructs the falling waveform segment of each of the plurality of first waveforms of each of the plurality of first waveform signals from the peak voltage of each of the plurality of first waveforms and counts the number of the constructed steps until when a voltage of one of the plurality of steps reach the initial voltage. A voltage difference between the initial voltage (such as the valley voltage of the first waveform signal WAM11 as shown in FIG. 10) and the peak voltage of each of the plurality of first waveform signals is equal to the first reference amplitude (such as the amplitude AM11 or AM12 of the first waveform signal WAM11 as shown in FIG. 10).

For example, as shown in FIG. 10, heights/voltages of the plurality of steps on the rising and falling waveform segments of the plurality of first waveforms of the first waveform signal WAM11 are equal to each other, and time lengths of the plurality of steps on the rising and falling waveform segments of the plurality of first waveforms of the first waveform signal WAM11 are equal to each other, but the present disclosure is not limited thereto.

The signal generator 30 sets a plurality of second reference amplitudes according to the plurality of first reference amplitudes. The signal generator 30 generates a plurality of waveforms as a plurality of second waveforms in each of a plurality of second waveform signals. The signal generator 30 modulates amplitudes of the plurality of second waveforms of each of the plurality of second waveform signals to be equal to the plurality of second reference amplitudes respectively. The signal generator 30 outputs the plurality of second waveform signals to the comparing circuit 50.

The signal generator 30 may store a plurality of second initial waveform signals each having a plurality of second initial waveforms. Amplitudes of the plurality of second initial waveforms of each of the plurality of second initial waveform signals are equal to each other.

The signal generator 30 may modulate the amplitudes of the plurality of second initial waveforms to be equal to the plurality of second reference amplitudes respectively. At least one of the plurality of second reference amplitudes are not equal to each other. For example, as shown in FIG. 11, when the oscillator circuit 20 modulates the amplitudes AM0 of some of the plurality of first initial waveforms to form the amplitudes AM12 of the first waveform signal WAM11, the signal generator 30 modulates one of two amplitudes AM2 of each of the plurality of third harmonic waveforms (that are the second initial waveforms) of the plurality of second waveform signals to form the amplitude AM0 of the second waveform signal WAM21.

For convenience of description, the modulated second initial waveforms of the second waveform signals are defined as the plurality of second waveforms herein.

The comparing circuit 50 compares the voltages of the plurality of first waveforms of the plurality of first waveform signals from the oscillator circuit 20 with the voltages of the plurality of second waveforms of the plurality of second waveform signals from the signal generator 30 to determine duty cycles of the plurality of waveforms of each of the plurality of on-time signals.

The control circuit 60 outputs a plurality of control signals according to the plurality of on-time signals from the comparing circuit 50. The driver circuit 70 outputs a plurality of driving signals from the plurality of control signals from the control circuit 60. The output stage circuit 80 operates to drive the motor MT according to the plurality of driving signals from the driver circuit 70.

It is worth noting that, the signal generator 30 may, according to modulation of the amplitudes of the plurality of first initial waveforms of each of the plurality of first waveform signals to the plurality of first reference amplitudes respectively, determine modulation of the amplitudes of the plurality of second initial waveforms to the plurality of second waveforms. As a result, the duty cycles of the plurality of waveforms of the plurality of on-time signals that are outputted to the control circuit 60 by the comparing circuit 50 are maintained in constant values.

That is, the comparing circuit 50 compares voltages of the plurality of first initial waveforms with voltages of the plurality of second initial waveforms to determine a plurality of preset duty cycles, respectively. The comparing circuit 50 compares the voltages of the plurality of first waveforms with voltages of the plurality of second waveforms to generate the plurality of on-time signals, and the duty cycles of the plurality of waveforms of the plurality of on-time signals are equal to the plurality of preset duty cycles respectively.

The duty cycles of the plurality of waveforms of the plurality of on-time signals generated by the motor driver of the present disclosure are maintained in the constant values such that the motor MT driven by the motor driver of the present disclosure rotates normally. At the same time, the motor driver of the present disclosure modulates the voltages of the plurality of first waveforms of the plurality of first waveform signals and the voltages of the plurality of second waveforms of the plurality of second waveform signals to change frequencies of the plurality of waveforms of the plurality of on-time signals. As a result, the electromagnetic wave energy emitted by the motor driver of the present disclosure is dispersed, thereby reducing electromagnetic interference to which other circuit components are subjected.

Figure 12:
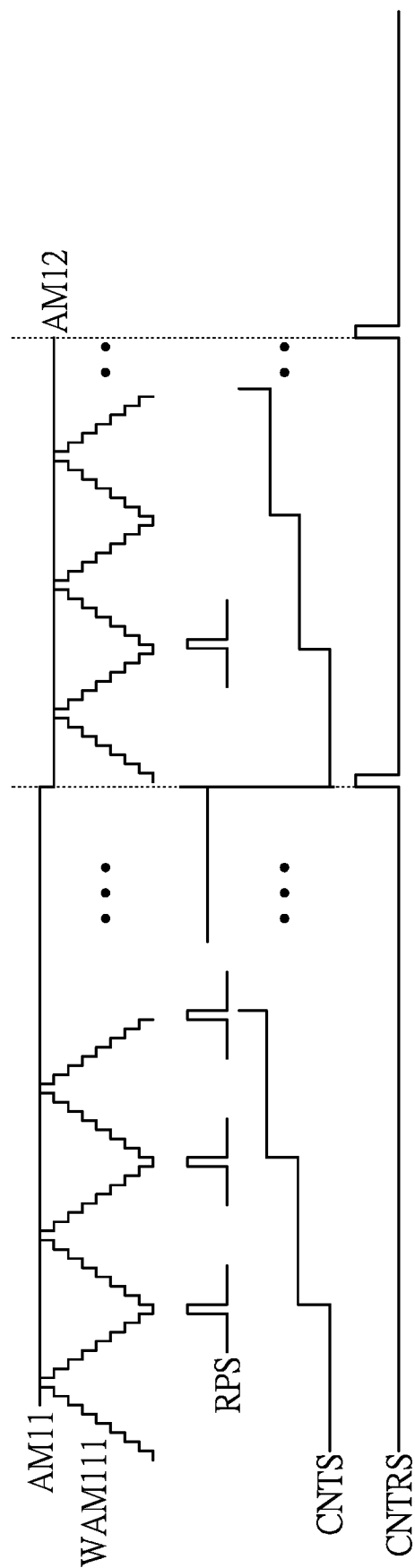
FIG. 12 is a waveform diagram of signals of the motor driver using the spread spectrum mechanism for reducing the electromagnetic interference according to the third embodiment of the present disclosure.

Reference is made to FIG. 2 and FIG. 12, in which FIG. 12 is a waveform diagram of signals of the motor driver using the spread spectrum mechanism for reducing the electromagnetic interference according to the third embodiment of the present disclosure.

The amplitudes of the plurality of first waveforms continuously generated by the oscillator circuit 20 within the same time interval may be the same as each other, and the amplitudes of the plurality of first waveforms generated by the oscillator circuit 20 within different time intervals may be different from each other. For example, as shown in FIG. 12, in a first waveform signal WAM111 outputted by the oscillator circuit 20, a plurality of first waveforms each having an amplitude AM11 are generated within one of a plurality of time interval and a plurality of first waveforms each having an amplitude AM12 are generated within a next one of the plurality of time interval, but the present disclosure is not limited thereto.

Each time when the oscillator circuit 20 completes the construction of one of the plurality of first waveforms in the first waveform signal WAM111, the oscillator circuit 20 generates a pulse wave in a first waveform rising instructing signal RPS. A rising edge of the pulse wave of the first waveform rising instructing signal RPS may be aligned with an ending time point of the first waveform of the one of the plurality of first waveforms that is constructed in the first waveform signal WAM111. A falling edge of the pulse wave of the pulse wave of the first waveform rising instructing signal RPS may be aligned with a start time point of a next one of the plurality of first waveforms of the first waveform signal WAM111.

Each time when the oscillator circuit 20 starts constructing each of the plurality of first waveforms, the oscillator circuit 20 may count once. As shown in FIG. 12, rising edges of a plurality of waveforms of a first waveform counting signal CNTS are aligned with the start time points of the plurality of first waveforms of the first waveform signal WAM111, respectively, and are aligned with falling edges of the pulse waves of the first waveform rising instructing signal RPS, respectively.

Each time when the count of the first waveforms being constructed in the first waveform signal WAM111 by the oscillator circuit 20 reaches a specific first waveform number, the oscillator circuit 20 completes the construction of the plurality of first waveforms within one of the plurality of time intervals. At this time, the pulse wave may be generated in a first waveform completion signal CNTRS, and a rising edge of the pulse wave of the first waveform completion signal CNTRS is assigned with an ending time point of the one of the plurality of time intervals and a start time point of a next one of the plurality of time intervals.

It is worth noting that, the amplitudes (such as the amplitude AM11) of the first waveforms that start to be generated in the first waveform signal WAM111 by the oscillator circuit 20 from a time point of the rising edge of the pulse wave of the first waveform completion signal CNTRS are different from the amplitudes (such as the amplitude AM12) of the first waveforms that are generated in the first waveform signal WAM111 by the oscillator circuit 20 before the time point of the rising edge of the pulse wave of the first waveform completion signal CNTRS.

In conclusion, the present disclosure provides the motor driver using the spread spectrum mechanism. The electromagnetic wave energy of the on-time signals outputted by the motor driver of the present disclosure is changed or dispersed at different ones of the plurality of frequencies. Therefore, the electromagnetic wave energy is not overly concentrated at the same one of the plurality of frequencies. As a result, the motor driver of the present disclosure is prevented from emitting the accumulated and amplified electromagnetic wave energy to cause electromagnetic interference to the operations of other circuit components. Therefore, through the motor driver of the present disclosure, electromagnetic suppression or elimination components such as beads do not need to be disposed on the circuit board, which saves circuit cost for configuration of circuit components, and wires on a circuit board do not need to be changed, which improving on the issue of high electromagnetic wave energy being emitted toward the other circuit components.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driver using a spread spectrum mechanism for reducing electromagnetic interference, comprising:
   a waveform frequency modulating circuit configured to generate a plurality of waveforms in each of a plurality of on-time signals and to output the plurality of on-time signals; and
   a motor driving circuit connected to the waveform frequency modulating circuit and a motor, and configured to drive the motor according to the plurality of on-time signals from the waveform frequency modulating circuit;
   wherein the waveform frequency modulating circuit modulates frequencies of at least some of the plurality of waveforms of each of the plurality of on-time signals to be different from each other, such that electromagnetic wave energy emitted by the motor driver is dispersed.

2. The motor driver according to claim 1, wherein the motor driving circuit includes:

a control circuit connected to the waveform frequency modulating circuit and configured to output a plurality of control signals according to the plurality of on-time signals;

a driver circuit connected to the control circuit and configured to output a plurality of driving signals according to the plurality of control signals; and an output stage circuit connected to the driver circuit and the motor, and configured to drive the motor according to the plurality of driving signals.

3. The motor driver according to claim 2, wherein the waveform frequency modulating circuit includes:

an oscillation control circuit configured to output an oscillation controlling signal;

an oscillator circuit connected to the oscillation control circuit, wherein the oscillator circuit sets a slope of each of a plurality of waveforms of each of a plurality of first waveform signals according to the oscillation controlling signal from the oscillation control circuit, the oscillator circuit generates the plurality of waveforms as a plurality of first waveforms in each of the plurality of first waveform signals, and the oscillator circuit modulates the slopes of at least some of the plurality of first waveforms of each of the plurality of first waveform signals to be different from each other, such that frequencies of at least some of the plurality of first waveforms of each of the plurality of first waveform signals are different from each other;

a signal generator configured to generate a plurality of waveforms as a plurality of second waveforms in each of a plurality of second waveform signals and configured to output the plurality of second waveform signals;

a digital-analog converter circuit connected to the signal generator, and configured to convert the plurality of second waveform signals that are digital signals into analog signals, and outputs the plurality of second waveform signals that are the analog signals; and a comparing circuit connected to the oscillator circuit and the digital-analog converter circuit, and configured to compare voltages of the plurality of first waveforms of each of the plurality of first waveform signals with voltages of the plurality of second waveforms of each of the plurality of second waveform signals to determine duty cycles of the plurality of waveforms of the plurality of on-time signals.

4. The motor driver according to claim 3, wherein the oscillator circuit sets a plurality of reference slopes, the oscillator circuit modulates the slope of each of the plurality of first waveforms generated within a same one of a plurality of time intervals to be equal to a same one of the plurality of reference slopes, and the oscillator circuit modulates the slopes of the plurality of first waveforms generated within at least one of the plurality of time intervals to be different from the slopes of the plurality of first waveforms generated within another of the plurality of time intervals.

5. The motor driver according to claim 3, wherein the oscillation control circuit includes:

a plurality of current sources connected to the oscillator circuit, wherein the plurality of current sources respectively supply a plurality of currents to the oscillator circuit, and the oscillator circuit determines the slope of each of the plurality of first waveforms of each of the plurality of first waveform signals according to values of the plurality of currents from the plurality of current sources.

6. The motor driver according to claim 5, wherein the oscillation control circuit further includes:

a plurality of switching components, wherein first terminals of the plurality of switching components are connected to the plurality of current sources, respectively, a second terminal of each of the plurality of switching components is connected to the oscillator circuit, and each of the plurality of switching components is switched between an on-state and an off-state.

7. The motor driver according to claim 6, wherein the oscillation circuit includes:

a capacitor, wherein a first terminal of the capacitor is connected to the second terminal of each of the plurality of switching components and the comparing circuit, a second terminal of the capacitor is grounded, and a voltage signal of the capacitor is outputted as each of the plurality of first waveform signals to the comparing circuit.

8. The motor driver according to claim 3, wherein the digital-analog converter circuit includes a plurality of digital-analog converters, the plurality of digital-analog converters includes a first digital-analog converter, a second digital-analog converter and a third digital-analog converter, the plurality of digital-analog converters are connected to the signal generator, and the plurality of digital-analog converters convert the plurality of second waveform signals that are the digital signals into the analog signals respectively.

9. The motor driver according to claim 3, wherein the comparing circuit includes a plurality of comparators, first input terminals of the plurality of comparators are connected to the oscillator circuit and receive the plurality of first waveform signals from the oscillator circuit, respectively, and second input terminals of the plurality of comparators are connected to an output terminal of the digital-analog converter circuit and respectively receive the plurality of second waveform signals from the output terminal of the digital-analog converter circuit.

10. The motor driver according to claim 1, wherein the waveform frequency modulating circuit includes:

an oscillator circuit configured to set a plurality of first reference amplitudes, wherein at least some of the plurality of first reference amplitudes are different from each other, the oscillator circuit generates a plurality of waveforms as a plurality of first waveforms in each of a plurality of first waveform signals, the oscillator circuit modulates amplitudes of the plurality of first waveforms of each of the plurality of first waveform signals to be equal to the plurality of first reference amplitudes, respectively, and the oscillator circuit outputs the plurality of first waveform signals;

a signal generator configured to set a plurality of second reference amplitudes according to the plurality of first reference amplitudes, wherein the signal generator generates a plurality of waveforms as a plurality of second waveforms in each of a plurality of second waveform signals, the oscillator circuit modulates amplitudes of the plurality of second waveforms of each of the plurality of second waveform signals to be equal to the plurality of second reference amplitudes, respectively, and the oscillator circuit outputs the plurality of second waveform signals; and a comparing circuit connected to the oscillator circuit and the signal generator, and configured to compare voltages of the plurality of first waveforms of each of the plurality of first waveform signals with voltages of the plurality of second waveforms of each of the plurality of second waveform signals to determine duty cycles of the plurality of waveforms of the plurality of on-time signals.

11. The motor driver according to claim 10, wherein the amplitudes of the plurality of first waveforms that are consecutively generated by the oscillator circuit within a same one of the plurality of time intervals are equal to each other, and the amplitudes of the plurality of first waveforms that are generated within a previous one of the plurality of time intervals are different from the amplitudes of the plurality of first waveforms that are generated within a next one of the plurality of time intervals.

12. The motor driver according to claim 10, wherein the duty cycles of the plurality of waveforms of each of the plurality of on-time signals generated by the comparing circuit are equal to a plurality of preset duty cycles respectively.

13. The motor driver according to claim 12, wherein the oscillator circuit modulates amplitudes of a plurality of first initial waveforms to be equal to the plurality of first reference amplitudes, respectively, the oscillator circuit uses the plurality of first initial waveforms that are modulated as the plurality of first waveforms, respectively, the oscillator circuit modulates amplitudes of a plurality of second initial waveforms to be equal to the plurality of second reference amplitudes, respectively, and the oscillator circuit uses the plurality of second initial waveforms that are modulated as the plurality of second waveforms, respectively.

14. The motor driver according to claim 13, wherein the comparing circuit compares voltages of the plurality of first initial waveforms with voltages of the plurality of second initial waveforms to determine the plurality of preset duty cycles.

15. The motor driver according to claim 10, wherein a rising waveform segment of each of the plurality of first waveforms of each of the plurality of first waveform signals is a staircase-shaped waveform segment, the oscillator circuit sets a number of steps of the rising waveform segments of the plurality of first waveforms of each of the plurality of first waveform signals to be equal to a plurality of reference rising step numbers, respectively, and at least some of the plurality of reference rising step numbers are different from each other.

16. The motor driver according to claim 15, wherein the oscillator circuit gradually constructs a plurality of steps of the rising waveform segment of each of the plurality of first waveforms of the plurality of first waveform signals from an initial voltage until when a voltage of one of the plurality of steps of the rising waveform segment of each of the plurality of first waveforms of the plurality of first waveform signals reaches a peak voltage, and a voltage difference between the initial voltage and the peak voltage of each of the plurality of first waveforms of the plurality of first waveform signals is equal to the first reference amplitude.

17. The motor driver according to claim 10, wherein a falling waveform segment of each of the plurality of first waveforms of each of the plurality of first waveform signals is a staircase-shaped waveform segment, the oscillator circuit sets a number of steps of the falling waveform segments of the plurality of first waveforms of each of the plurality of first waveform signals to be equal to a plurality of reference falling step numbers, respectively, and at least some of the plurality of reference falling step numbers are different from each other.

18. The motor driver according to claim 17, wherein the oscillator circuit gradually constructs the falling waveform segment of each of the plurality of first waveforms of the plurality of first waveform signals from a peak voltage until when a voltage of one of the plurality of steps of the falling waveform segment of each of the plurality of first waveforms of the plurality of first waveform signals reaches an initial voltage, and a voltage difference between the initial voltage and the peak voltage of each of the plurality of first waveforms of the plurality of first waveform signals is equal to the first reference amplitude.

* * * * *